(12) United States Patent
Welchko et al.

(10) Patent No.: US 7,218,071 B1
(45) Date of Patent: May 15, 2007

(54) METHOD AND APPARATUS FOR INCREASING AC MOTOR TORQUE OUTPUT AT LOW FREQUENCY

(75) Inventors: Brian Welchko, Torrance, CA (US); Steven E. Schulz, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/375,429

(22) Filed: Mar. 14, 2006

(51) Int. Cl.
*H02P 27/06* (2006.01)
(52) U.S. Cl. .................. 318/434; 318/432
(58) Field of Classification Search ......... 318/430–434
See application file for complete search history.

(56) References Cited

U.S. PATENT DOCUMENTS

| 4,085,355 | A | * | 4/1978 | Fradella | 318/703 |
| 4,132,368 | A | * | 1/1979 | Schiess et al. | 242/364.8 |
| 4,240,020 | A | * | 12/1980 | Okuyama et al. | 318/721 |
| 4,320,331 | A | * | 3/1982 | Plunkett | 318/722 |
| 6,628,096 | B1 | * | 9/2003 | Chen | 318/254 |
| 7,138,776 | B1 | * | 11/2006 | Gauthier et al. | 318/245 |

* cited by examiner

*Primary Examiner*—Bentsu Ro
(74) *Attorney, Agent, or Firm*—Christopher DeVries

(57) ABSTRACT

Methods and apparatus are provided for controlling AC motor torque output. The method comprises the steps of producing a current based on a first comparison of a fundamental output frequency of the AC motor with a predetermined frequency and a second comparison of a magnitude of a commanded current with a predetermined DC current, and supplying the current to the AC motor.

18 Claims, 4 Drawing Sheets

METHOD AND APPARATUS FOR INCREASING AC MOTOR TORQUE OUTPUT AT LOW FREQUENCY

TECHNICAL FIELD

The present invention generally relates to controlling alternating current (AC) motors, and more particularly relates to apparatus and methods for controlling the torque output of sinusoidally wound AC motors.

BACKGROUND OF THE INVENTION

AC motors are used in a variety of applications, including vehicle applications such as traction control. The AC motors used in vehicle applications are typically controlled (e.g., via a voltage source inverter) such that the motor phase currents are sinusoidal. These AC motors are generally permanent magnet motors designed to have a sinusoidally-shaped back electromagnetic field (emf) waveform. Supplying a sinusoidally shaped input current to the AC motor typically produces the highest average torque without additional low-frequency harmonies which can be a source of torque pulsations in the AC motors.

When operating the AC motor at higher frequencies over a fundamental output cycle of the AC motor, thermal stresses in the voltage source inverter are usually evenly distributed among the switch network (e.g, among the six switches based on a transistor-diode combination). At lower frequencies, including stall, the transient thermal impedance of these switches may occur over periods that are less than the period of the fundamental output cycle. As a result, the thermal stresses in the voltage source inverter may be unevenly distributed for short time periods, and some switches respond to the uneven distribution with elevated temperatures that limit the current carrying capacity of such switches. Depending on the operating range of the fundamental output frequencies, the output current capacity of the voltage source inverter at low frequencies, including direct current (DC), may be substantially reduced in comparison with the output current capacity of the voltage source inverter operating at higher fundamental frequencies.

Accordingly, it is desirable to provide a method for controlling AC motor torque output at lower operating frequencies. Additionally, it is desirable to provide a voltage source inverter that controls an AC motor to increase torque output at lower operating frequencies. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for controlling AC motor torque output. In an exemplary embodiment, a method is provided for controlling an AC motor. The method comprises the steps of performing a first comparison by comparing a fundamental output frequency of the AC motor with a predetermined frequency, performing a second comparison by comparing a magnitude of a commanded current with a predetermined DC, generating a motor current based on the first comparison and the second comparison, and providing the motor current to the AC motor.

In another exemplary embodiment, a method is provided for controlling a sinusoidal AC motor comprising the steps of detecting a fundamental output frequency of the sinusoidal AC motor and a commanded current magnitude, producing a first current having a sinusoidal waveform when the fundamental output frequency is greater than a predetermined frequency, producing the first current when the fundamental output frequency is less than the predetermined frequency and the commanded current magnitude is less than a predetermined DC current, producing a second current having a trapezoidal waveform when the fundamental output frequency is less than the predetermined frequency and the commanded current magnitude is greater than the predetermined DC current, and supplying either of the first current or the second current to the sinusoidal AC motor.

A voltage source inverter for controlling a torque output of an AC motor comprises a controller and a switch network having an input coupled to the controller and an output configured to couple to the AC motor. The controller is configured to compare a fundamental output frequency of the AC motor with a predetermined frequency, compare a commanded current magnitude of the voltage source inverter with a predetermined DC current, and transmit a signal based on the fundamental output frequency and the commanded current magnitude. The switch network is configured to produce a current in response to the signal. In one embodiment, the current has a sinusoidal waveform or a trapezoidal waveform, based on the signal.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
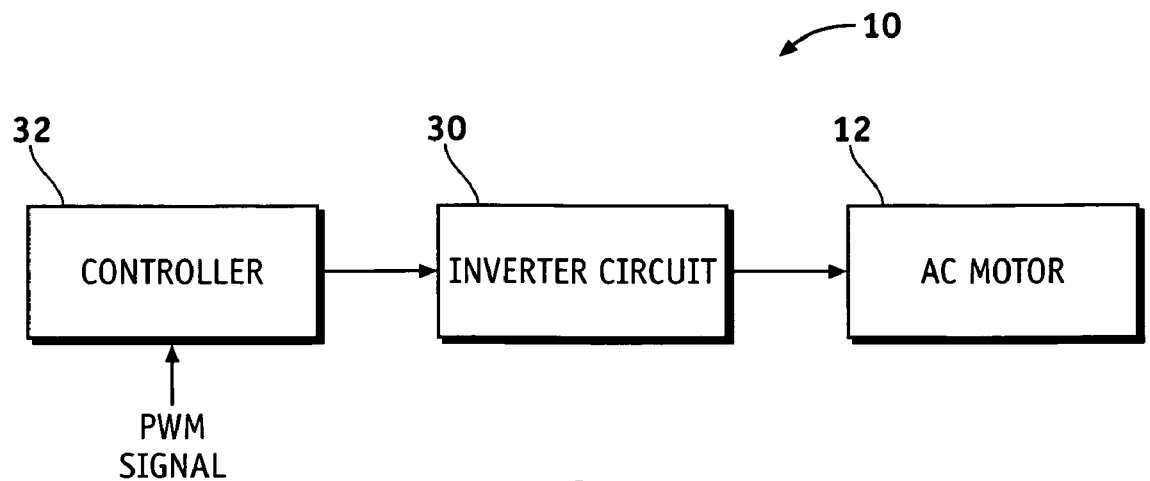
FIG. 1 is a schematic diagram of a voltage source inverter system in accordance with an exemplary embodiment of the present invention.

Referring to FIG. 1, a voltage source inverter system 10 is shown in accordance with an exemplary embodiment of the present invention. The voltage source inverter system 10 comprises a controller 32, an inverter circuit 30 coupled to the controller 32, and an alternating current (AC) motor 12 coupled to the inverter circuit 30. Generally, the controller 32 has a first input configured to receive a Pulse Width Modulation (PWM) signal and a second input configured to receive a fundamental output frequency of the AC motor 12, such as via a direct feedback loop with the AC motor or indirectly via the inverter circuit 30. The controller 32 produces an output signal received by the inverter circuit 30 which then converts the output signal to a modulated voltage waveform for operating the AC motor 12. The AC motor 12 is a sinusoidally-wound AC motor (e.g., permanent magnet or induction) such as commonly used in automotive vehicles (e.g., traction drive control systems, and the like).

Figure 2:
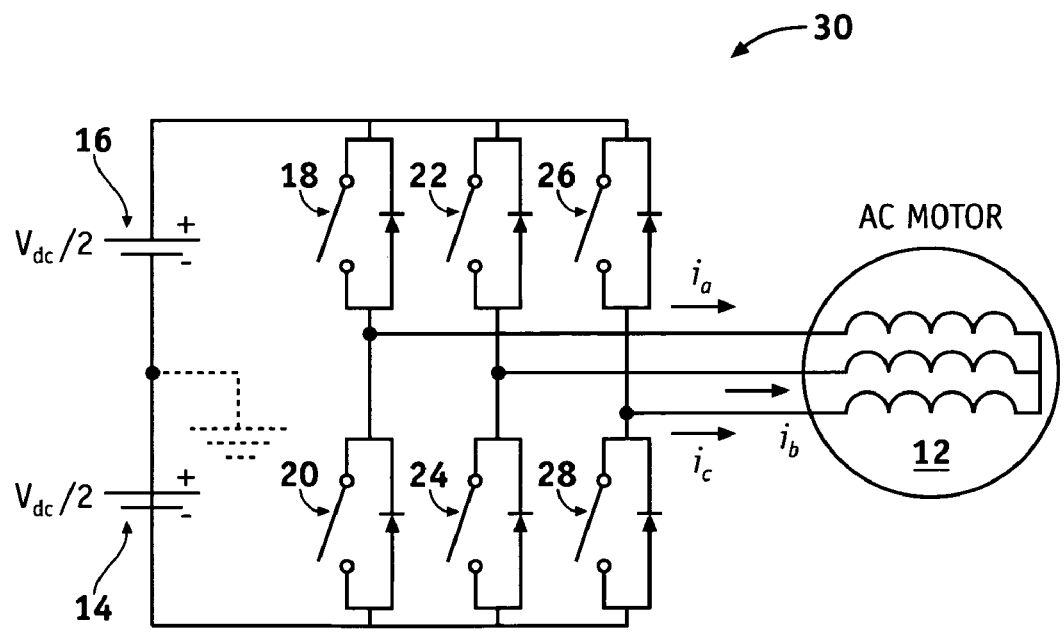
FIG. 2 is a schematic diagram of the inverter circuit shown in FIG. 1.

FIG. 2 is the inverter circuit 30 of FIG. 1 in greater detail. The inverter circuit 30 is a three-phase circuit coupled to the AC motor 12. More specifically, the inverter circuit 30 comprises voltage sources (14, 16) and a switch network having a first input coupled to the voltage sources (14, 16) and an output configured to couple to the AC motor 12. Although voltages sources (14, 16) are shown as a distributed DC link with two series sources, a single voltage source may be used.

The switch network comprises three pairs of series switches with antiparallel diodes (i.e., antiparallel to each switch) corresponding to each of the phases. Each of the pairs of series switches comprises a first switch (18, 22, 26) having a first terminal coupled to a positive electrode of the voltage source (14, 16) and a second switch (20, 24, 28) having a second terminal coupled to a negative electrode of the voltage source (14, 16) and having a first terminal coupled to a second terminal of the first switch (18, 22, 26), respectively.

Figure 3:
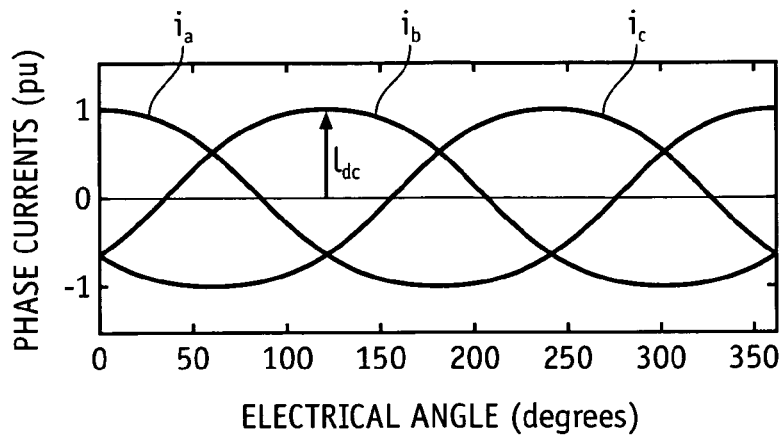
FIG. 3 is a phase current waveform useful in explaining the operation of an AC motor system.

FIG. 3 is a phase current waveform useful in explaining the operation of an AC motor system. A conventional voltage source inverter controlling an AC motor typically produces three sinusoidal-shaped phase currents ($i_a$, $i_b$, and $i_c$) each having an amplitude ($I_{dc}$). To operate the AC motor at lower fundamental frequencies, currents having a lower amplitudes are typically produced by the conventional voltage source inverter which in turn lowers torque production by the AC motor.

Figure 4:
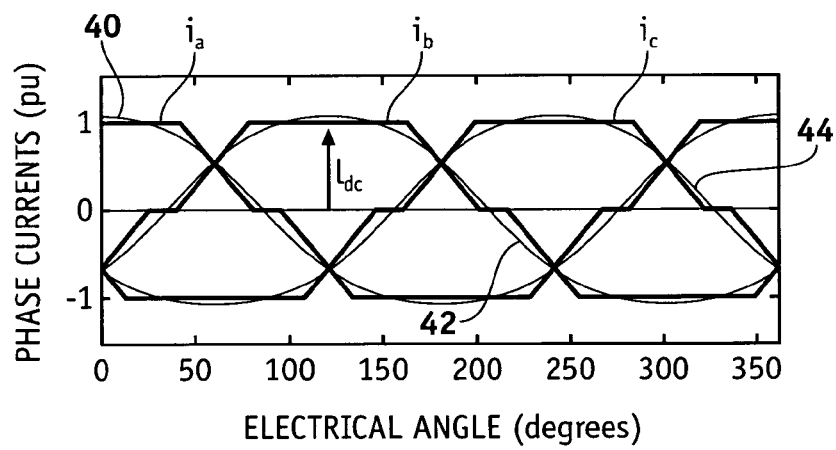
FIG. 4 is a phase current waveform and a fundamental component waveform of the phase current in accordance with an exemplary embodiment of the present invention useful in explaining the operation of the voltage source inverter 10 shown in FIG. 1.

FIG. 4 is a phase current waveform and a fundamental component waveform of the phase current in accordance with an exemplary embodiment of the present invention useful in explaining the operation of the voltage source inverter 10 shown in FIG. 1. In this exemplary embodiment, the voltage source inverter 10 shown in FIG. 1 produces three trapezoidal-shaped phase currents ($i_a$, $i_b$, and $i_c$) each having an amplitude ($I_{dc}$). Each of the trapezoidal-shaped phase currents ($i_a$, $i_b$, and $i_c$) are associated with a fundamental component (40, 42, and 44, respectively). For a given amplitude ($I_{dc}$) of the trapezoidal-shaped phase currents, which are substantially equal to the amplitude of the sinusoidal-shaped phase currents shown in FIG. 3, the fundamental component (40, 42, and 44) is larger than the amplitude of the sinusoidal phase currents shown in FIG. 3. This larger fundamental component (40, 42, and 44) provides an overall increase in torque output from the AC motor with respect to the DC current limit.

Referring to FIGS. 1 and 4, the controller 32 is configured to determine when the fundamental output frequency of the AC motor 30 is less than a predetermined threshold frequency. This predetermined threshold frequency is determined based on a variety of system objectives (e.g., when the fundamental component exceeds the amplitude of an input sinusoidal current) and is preferably about 3 Hz, but may vary depending on various factors such as module design. The predetermined threshold is stored in the controller 32 for real time retrieval during operation of the AC motor 12. In the event that the fundamental output frequency of the AC motor 30 is greater than the predetermined threshold frequency, the controller 32 transmits a first signal directing the inverter circuit 30 to output a three-phase sinusoidal current. In the event the fundamental output frequency of the AC motor 30 is less than the predetermined threshold frequency, the controller 32 then determines when the amplitude of the commanded phase currents from the inverter circuit 30 are greater than the DC current-carrying capacity of the inverter circuit 30 (e.g., $I_{dc}$). In the event the amplitude of the commanded phase currents from the inverter circuit 30 is less than the DC current-carrying capacity of the inverter circuit 30, the controller 32 continues to transmit the first signal controlling the inverter circuit 30 to output a three-phase sinusoidal current. In the event the amplitude of the commanded phase currents from the inverter circuit 30 is greater than the DC current carrying capacity of the inverter circuit 30, the controller 32 transmits a second signal directing the inverter circuit 30 to output a three-phase trapezoidal current. Additionally, the controller 32 may configure the shape of the three-phase trapezoidal current to achieve a variety of system objectives.

Figure 5:
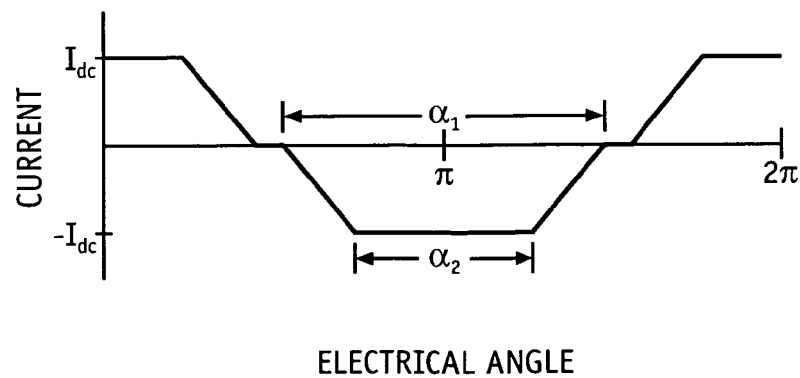
FIG. 5 is a trapezoidal waveform useful in explaining the waveform properties.

FIG. 5 is a trapezoidal waveform useful in explaining the waveform properties. The trapezoidal waveform is characterized by three parameters: an amplitude ($I_{dc}$) (e.g., the amplitude of the trapezoidal current), a width ($\alpha_1$) of the base of the trapezoidal waveform, and a width ($\alpha_2$) of the top of the trapezoidal waveform. For three-phase permanent magnet AC motors without a neutral return, the sum of the three phase currents is zero in accordance with Kirchoff's Law. Thus, the values of the widths ($\alpha_1$ and $\alpha_2$) are given as $$2\pi/3 \leq \alpha_1 \leq \pi, \text{ and}$$

$$\alpha_1 + \alpha_2 = 4\pi/3.$$

Figure 6:
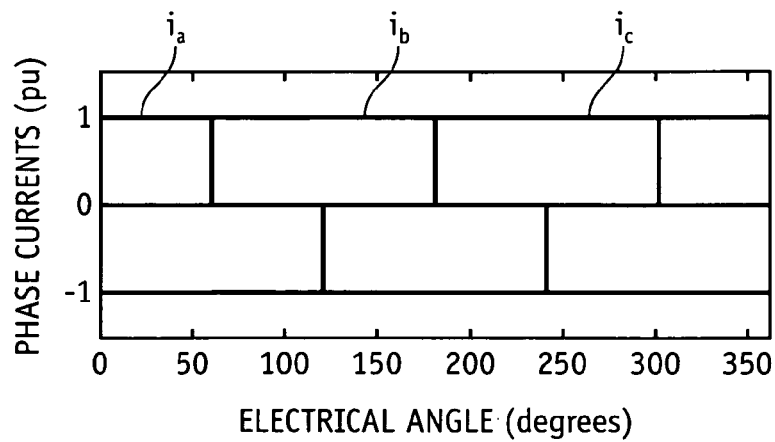
FIG. 6 is a phase current waveform in accordance with an exemplary embodiment.
Figure 7:
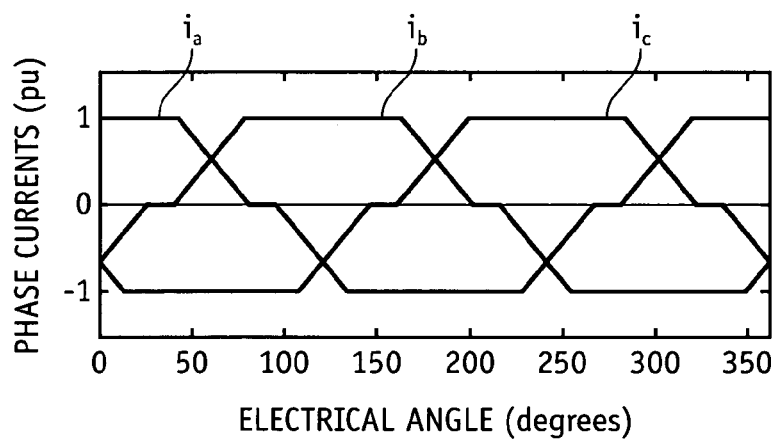
FIG. 7 is a phase current waveform in accordance with another exemplary embodiment.
Figure 8:
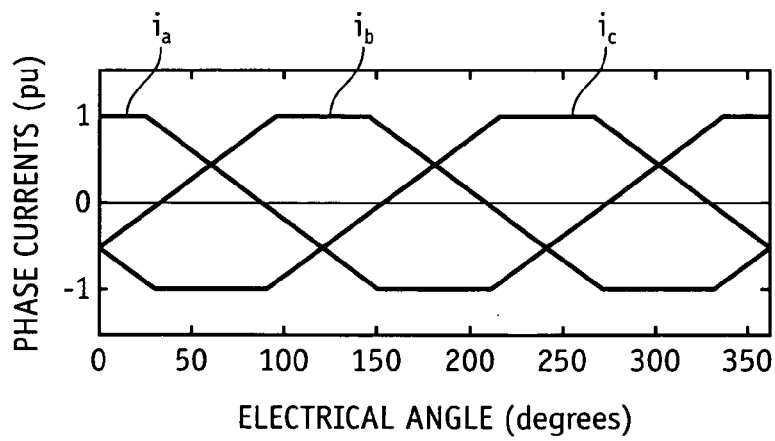
FIG. 8 is a phase current waveform in accordance with another exemplary embodiment.

FIG. 6 is a phase current waveform in accordance with an exemplary embodiment illustrating lower limit phase currents ($i_a$, $i_b$, and $i_c$) (e.g., a square wave) when $\alpha_1 = 2\pi/3$. Similarly, the phase current waveform shown in FIG. 7 illustrates phase currents ($i_a$, $i_b$, and $i_c$) when $\alpha_1 = 5\pi/6$, and the phase current waveform shown in FIG. 8 illustrates upper limit phase currents ($i_a$, $i_b$, and $i_c$) when $\alpha_1 = \pi$.

Figure 9:
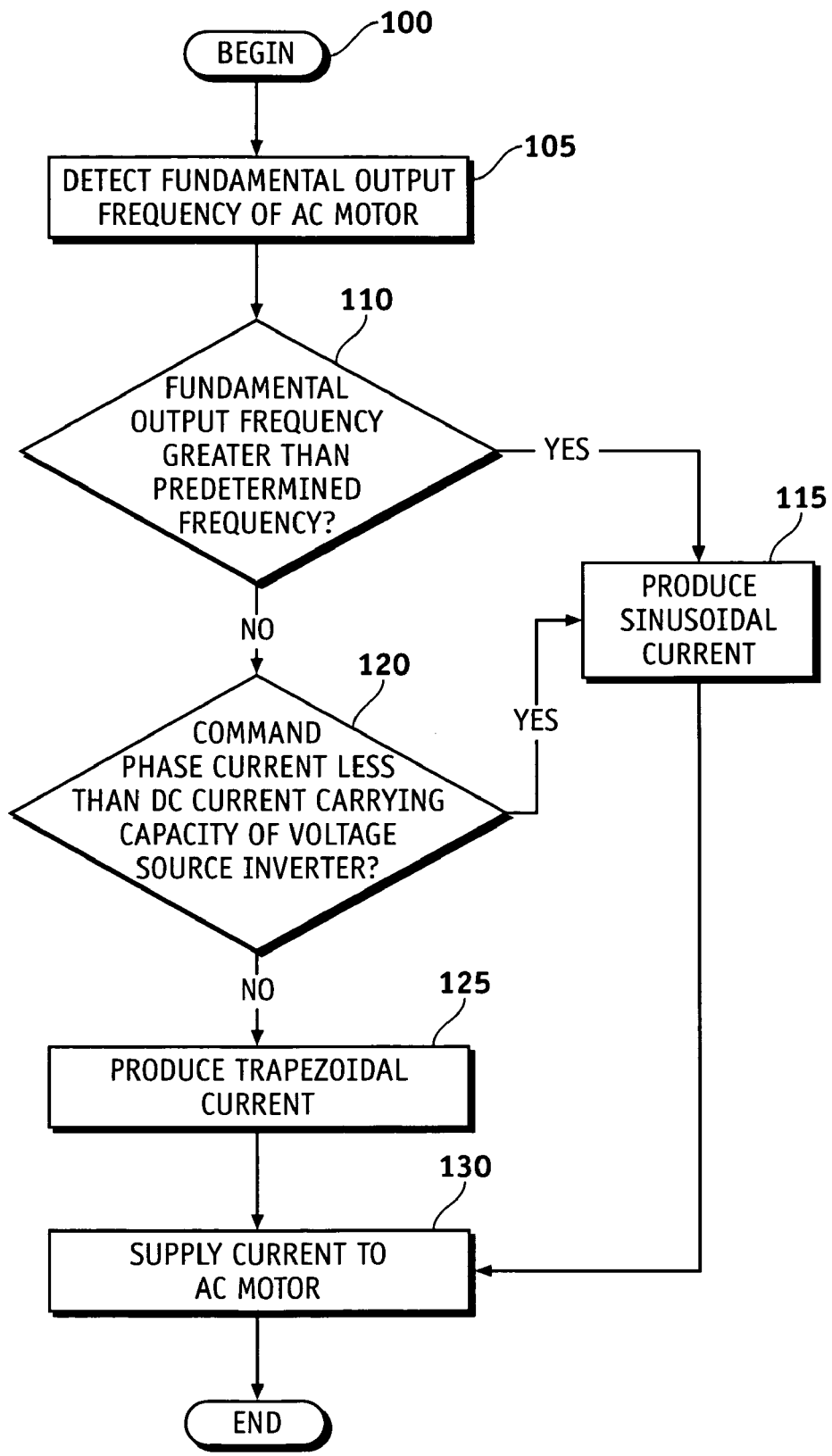
FIG. 9 is a method for controlling a voltage source inverter in accordance with an exemplary embodiment of the present invention.

FIG. 9 is a flow diagram of a method for controlling a voltage source inverter in accordance with an exemplary embodiment of the present invention. Referring to FIGS. 1 and 9, the method begins at step 100. The controller 32 detects the fundamental output frequency of the AC motor 12 at step 105. The controller 32 then determines whether the fundamental output frequency of the AC motor 12 is greater than a predetermined frequency at step 110. In the event the fundamental output frequency of the AC motor 12 is greater than the predetermined frequency, the controller 32 transmits the first signal directing the inverter circuit 30 to output a three-phase sinusoidal current ("the commanded current") at step 115. In the event the fundamental output frequency of the AC motor 30 is less than the predetermined threshold frequency, the controller 32 then determines whether the amplitude of the commanded phase currents from the inverter circuit 30 is greater than the DC current carrying capacity of the inverter circuit 30 at step 120. In the event the amplitude of the commanded phase currents from the inverter circuit 30 is less than the DC current carrying capacity of the inverter circuit 30, the controller 32 continues to transmit the first signal controlling the inverter circuit 30 to output a three-phase sinusoidal current at step 115. In the event the amplitude of the commanded phase currents from the inverter circuit 30 is greater than the DC current carrying capacity of the inverter circuit 30, the controller 32 transmits a second signal controlling the inverter circuit 30 to output a three-phase trapezoidal current at step 125. The three-phase trapezoidal current and the three-phase sinusoidal current are supplied by the inverter circuit 30 to the AC motor 12 at step 130. Additionally, the controller 32 may select the bottom width ($\alpha_1$) and the top width ($\alpha_2$) of the trapezoidal waveform such that $2\pi/3 \leq \alpha_1 \leq \pi$ and $\alpha_1 + \alpha_2 = 4\pi/3$.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an alternating current (AC) motor configured to receive an input sinusoidal current from an inverter, the method comprising the steps of:
    performing a first comparison by comparing a fundamental output frequency of the AC motor with a predetermined frequency;
    performing a second comparison by comparing a magnitude of a commanded current with a predetermined direct current (DC) current carrying capacity of the inverter;
    generating a motor current having a trapezoidal waveform if the fundamental output frequency of the AC motor is less than the predetermined frequency and if the magnitude of the commanded current is greater than the predetermined DC current carrying capacity, a fundamental component of the motor current exceeding an amplitude of the input sinusoidal current at the predetermined frequency; and
    providing the motor current to the AC motor.

2. A method according to claim 1, wherein said generating step comprises controlling the inverter to produce the current.

3. A method according to claim 1 further comprising detecting the fundamental output frequency of the AC motor.

4. A method according to claim 1, further comprising generating a motor current having a sinusoidal waveform if the fundamental output frequency is greater than the predetermined frequency.

5. A method according to claim 1, wherein said step of performing the second comparison comprises comparing the commanded current with the predetermined DC current carrying capacity if the fundamental output frequency is less than the predetermined frequency.

6. A method according to claim 1, wherein said generating step comprises generating a motor current having a sinusoidal waveform if the fundamental output frequency is less than the predetermined frequency and the commanded current is less than the predetermined current carrying capacity.

7. A method according to claim 1, further comprising generating a motor current having a trapezoidal waveform if the fundamental output frequency is less than the predetermined frequency and the commanded current if greater than the predetermined DC current carrying capacity.

8. A method according to claim 1, wherein said generating step comprises generating the motor current having the trapezoidal waveform if the fundamental output frequency is less than the predetermined frequency and the commanded current is greater than the predetermined DC current carrying capacity, the trapezoidal waveform having a first waveshape property ($\alpha_1$) and a second waveshape property ($\alpha_2$), and wherein $2\pi/3 \leq \alpha_1 \leq \pi$ and $\alpha_1 + \alpha_2 = 4\pi/3$.

9. A method according to claim 1, wherein said step of performing the first comparison comprises comparing the fundamental output frequency to a predetermined frequency of about 3 Hz.

10. A method for controlling a sinusoidal AC motor configured to receive an input sinusoidal current from an inverter, the method comprising the steps of:
    detecting a fundamental output frequency of the sinusoidal AC motor and a commanded current magnitude;
    producing a first current having a sinusoidal waveform if the fundamental output frequency is greater than a predetermined frequency;
    producing the first current if the fundamental output frequency is less than the predetermined frequency and the commanded current magnitude is less than a predetermined DC current carrying capacity of the inverter;
    producing a second current having a trapezoidal waveform if the fundamental output frequency is less than the predetermined frequency and if the commanded current magnitude is greater than the predetermined DC current carrying capacity, a fundamental component of the second current exceeding an amplitude of the input sinusoidal current at the predetermined frequency; and
    supplying one of the first current and the second current to the sinusoidal AC motor.

11. A method according to claim 10, wherein the trapezoidal waveform has a first waveshape property ($\alpha_1$) and a second waveshape property ($\alpha_2$), wherein said step of producing a second current comprises selecting the first waveshape property ($\alpha_1$) and the second waveshape property ($\alpha_2$), wherein $2\pi/3 \leq \alpha_1 \leq \pi$ and $\alpha_1 + \alpha_2 = 4\pi/3$.

12. A method according to claim 10, wherein said step of producing a first current having a sinusoidal waveform if the fundamental output frequency is greater than a predetermined frequency comprises directing the inverter to produce the first current;
    wherein said step of producing the first current if the fundamental output frequency is greater than the predetermined frequency and the commanded current magnitude is less than a predetermined DC current carrying capacity comprises directing the inverter to produce the first current; and
    wherein said step of producing a second current comprises controlling the inverter to produce the second current.

13. A method according to claim 12, wherein the commanded current magnitude comprises a phase current magnitude from the inverter to the AC motor.

14. A voltage source inverter for controlling a torque output of an AC motor configured to receive an input sinusoidal current, the voltage source inverter comprising:

a controller configured to:
    compare a fundamental output frequency of the AC motor with a predetermined frequency;
    compare a commanded current magnitude of the voltage source inverter with a predetermined DC current carrying capacity of the inverter; and
    transmit a first signal if said fundamental output frequency is less than said predetermined frequency and if said commanded current magnitude is greater than said predetermined DC current carrying capacity; and
a switch network having an input coupled to said controller and having an output configured to couple to the AC motor, said switch network configured to produce a first current in response to said first signal, said first current having a trapezoidal waveform, a fundamental component of said first current exceeding an amplitude of the input sinusoidal current at said predetermined frequency.

15. A voltage source inverter according to claim 14, wherein said controller is further configured to:
    transmit a second signal if said fundamental output frequency is greater than said predetermined frequency; and
    transmit the second signal if said fundamental output frequency is less than said predetermined frequency and said commanded current magnitude is less than said predetermined DC current carrying capacity.

16. A voltage source inverter according to claim 15, wherein said switch network is further configured to:
    produce a first current having a sinusoidal waveform in response to said second signal; and
    produce a second current having a trapezoidal waveform in response to the second signal.

17. A voltage source inverter according to claim 14, wherein said controller is further configured to:
    select a first waveshape property ($\alpha_1$) of said trapezoidal waveform and a second waveshape property ($\alpha_2$) of said trapezoidal waveform, wherein $2\pi/3 \leq \alpha_1 \leq \pi$ and $\alpha_1 + \alpha_2 = 4\pi/3$; and
    generate said first signal based on said first waveshape property ($\alpha_1$) and said second waveshape property ($\alpha_2$).

18. A voltage source inverter according to claim 13, wherein said commanded current magnitude comprises a commanded phase current magnitude of the voltage source inverter.

* * * * *